United States Patent [19]
Hardt

[11] Patent Number: 5,375,038
[45] Date of Patent: Dec. 20, 1994

[54] COMPUTER TOWER UNIT HAVING INTERNAL AIR FLOW CONTROL BAFFLE STRUCTURE

[75] Inventor: Thomas T. Hardt, Missouri City, Tex.

[73] Assignee: Compaq Computer Corporation, Houston, Tex.

[21] Appl. No.: 204,633

[22] Filed: Mar. 2, 1994

[51] Int. Cl.⁵ .............................................. H05K 7/20
[52] U.S. Cl. ..................................... 361/694; 361/688
[58] Field of Search ................................. 361/687–697

[56] References Cited

U.S. PATENT DOCUMENTS

| | | | |
|---|---|---|---|
| 4,644,443 | 2/1987 | Swensen et al. | 361/687 |
| 4,797,783 | 1/1989 | Kohmoto et al. | 361/695 |
| 5,101,320 | 3/1992 | Bharsava et al. | 361/694 |
| 5,136,465 | 8/1992 | Benck et al. | 361/687 |
| 5,142,442 | 8/1992 | Daniels et al. | 361/726 |
| 5,287,244 | 2/1994 | Hileman et al. | 361/687 |

*Primary Examiner*—Gregory D. Thompson
*Attorney, Agent, or Firm*—Konneker Bush Hitt & Chwang

[57] ABSTRACT

A computer tower unit is provided with two cooling fans, a system cooling fan and a power supply cooling fan, that draw ambient air through the unit via a pair of upper and lower exterior wall air inlet openings disposed opposite the two fans to cool a motherboard, a power supply unit, disc drives and expansion cards disposed in the unit. The need for a separate fan to cool the disc drives is eliminated by a specially designed air flow control baffle disposed within the unit. The baffle functions to cause cooling air drawn into the unit through the lower air inlet opening by the system cooling fan to be deflected toward and be drawn upwardly along the motherboard before being discharged by the fan, and also cause a portion of the air drawn into the unit through the upper inlet opening by the system cooling fan to be drawn through the disc drive mounting area within the unit to thereby cool the system disc drives without the use of a separate drive unit cooling fan. The baffle is preferably formed from a transparent plastic material, and is mounted within the tower unit in a manner such that, with a housing access wall of the unit removed, the baffle may be pivoted outwardly to permit easy service access to the motherboard.

10 Claims, 3 Drawing Sheets

COMPUTER TOWER UNIT HAVING INTERNAL AIR FLOW CONTROL BAFFLE STRUCTURE

BACKGROUND OF THE INVENTION

1. Field of the Invention

The present invention generally relates to computer apparatus and, in a preferred embodiment thereof, more particularly relates to the internal cooling of computer tower units.

2. Description of Related Art

In the realms of both personal and business computing applications computer tower units have become quite popular in recent years due primarily to their substantially increased expansion capabilities compared to typical desktop computers. The housing of the usual computer tower unit is of a vertically elongated configuration, and is designed to be stood on end on the floor adjacent a desk atop which the other two primary personal computer system components, a keyboard and a display monitor, are disposed.

As conventionally constructed, a computer tower unit housing has top and bottom walls, vertically elongated front and rear end walls, and a pair of vertically extending opposite side walls which have horizontal dimensions substantially greater than those of the front and rear end walls. Typically, one of the opposite side walls is removable to provide ready access to the interior of the tower unit.

Because of the large number of heat generating components, such as processors, drive units, expansion cards and power supply units, which may be initially or subsequently installed within the outer housing of a computer tower unit, proper interior cooling of the unit becomes an important design criteria, and the cooling capacity must be sufficient to handle the maximum number of heat generating components that might ultimately be installed in the unit.

In a previously proposed computer tower unit configuration upper and lower air intake structures are mounted on upper and lower portions of the front housing end wall, a power supply cooling fan is mounted on a top portion of the rear end wall generally opposite the upper air intake structure, and a main system cooling fan is mounted on a vertically intermediate portion of the rear end wall. A power supply unit is mounted within the tower housing between a top portion of the upper air intake and the power supply cooling fan, and a drive bay area is positioned directly behind a lower section of the upper air intake.

The main system motherboard is interiorly mounted on the housing side wall opposite the removable side access wall, and an expansion card mounting area is disposed behind the lower air intake structure in a lower portion of the housing interior adjacent the motherboard. The power supply area, the drive bay area, and the expansion card area are all communicated with one another within the interior of the tower unit housing.

During operation of the tower unit, the power supply and main system fans draw ambient cooling air through the interior of the housing to carry away operating heat generated by the various components therein. In addition to these two cooling fans, a third cooling fan is side-mounted on the housing, at the drive bay area, to ensure a flow of cooling air through the drive bay area via the upper air intake structure.

In the previously proposed computer unit configuration generally described above it was thus thought to be necessary to provide three separate cooling fans to dissipate component heat generated in the power supply, drive bay and expansion card areas in the housing during tower unit operation. The necessity of providing three such cooling fans, of course, adds to the overall cost of the tower unit. It would accordingly be desirable to provide an improved computer tower unit, having a configuration generally as described above, which could be cooled with a lesser number of fans. It is thus an object of the present invention to provide such an improved computer tower unit.

SUMMARY OF THE INVENTION

The present invention provides a computer tower unit, having an overall configuration similar to the previously proposed unit generally described, in which the separate drive bay area cooling fan is advantageously eliminated. This desirable ability to eliminate the third cooling fan, while at the same providing adequate interior tower unit housing cooling with the remaining power supply and main system cooling fans, arises through the use of specially designed air flow control baffle means embodying principles of the present invention and incorporated in the interior of the computer tower unit housing.

The air flow control baffle means generally extend within the tower unit housing vertically from a point somewhat above the expansion card area to the lower side of the power supply area, and horizontally between the rear end of the drive bay area and the inlet side of the main system cooling fan. During operation of the tower unit, the main system cooling fan draws a first cooling air portion inwardly through the upper air intake structure and through the drive bay area before discharging the first cooling air portion to ambient. At the same time the main system cooling fan draws a second cooling air portion inwardly through the lower air intake structure and through the expansion card area before discharging the air to ambient.

The air flow control baffle means are operative to cause this second cooling air portion to be sequentially drawn by the main system cooling fan rearwardly through the expansion card area and then be deflected toward and upwardly along the motherboard before being discharged through the fan to ambient. In this manner, adequate flows of cooling air are caused to internally traverse the power supply, drive bay and expansion card areas utilizing only the power supply and main system cooling fans, and without the previously required separate drive area cooling fan.

In a preferred embodiment thereof the air flow control baffle means comprise a transparent plastic baffle member releasably latched in an operating position within the computer tower unit interior. With the side access wall of the tower unit housing unit removed, the baffle member may be pivoted outwardly to an access position to provide manual access to the motherboard. In addition to permitting the cost saving elimination of the previously utilized separate drive bay cooling fan, the baffle member also directs cooling air through the housing interior when the side access wall is removed in a manner such that operation of the tower unit with this access wall removed does not cause appreciable air flow short circuiting that could potentially cause overheating of the electronic components within the tower unit housing.

DETAILED DESCRIPTION

Figure 1:
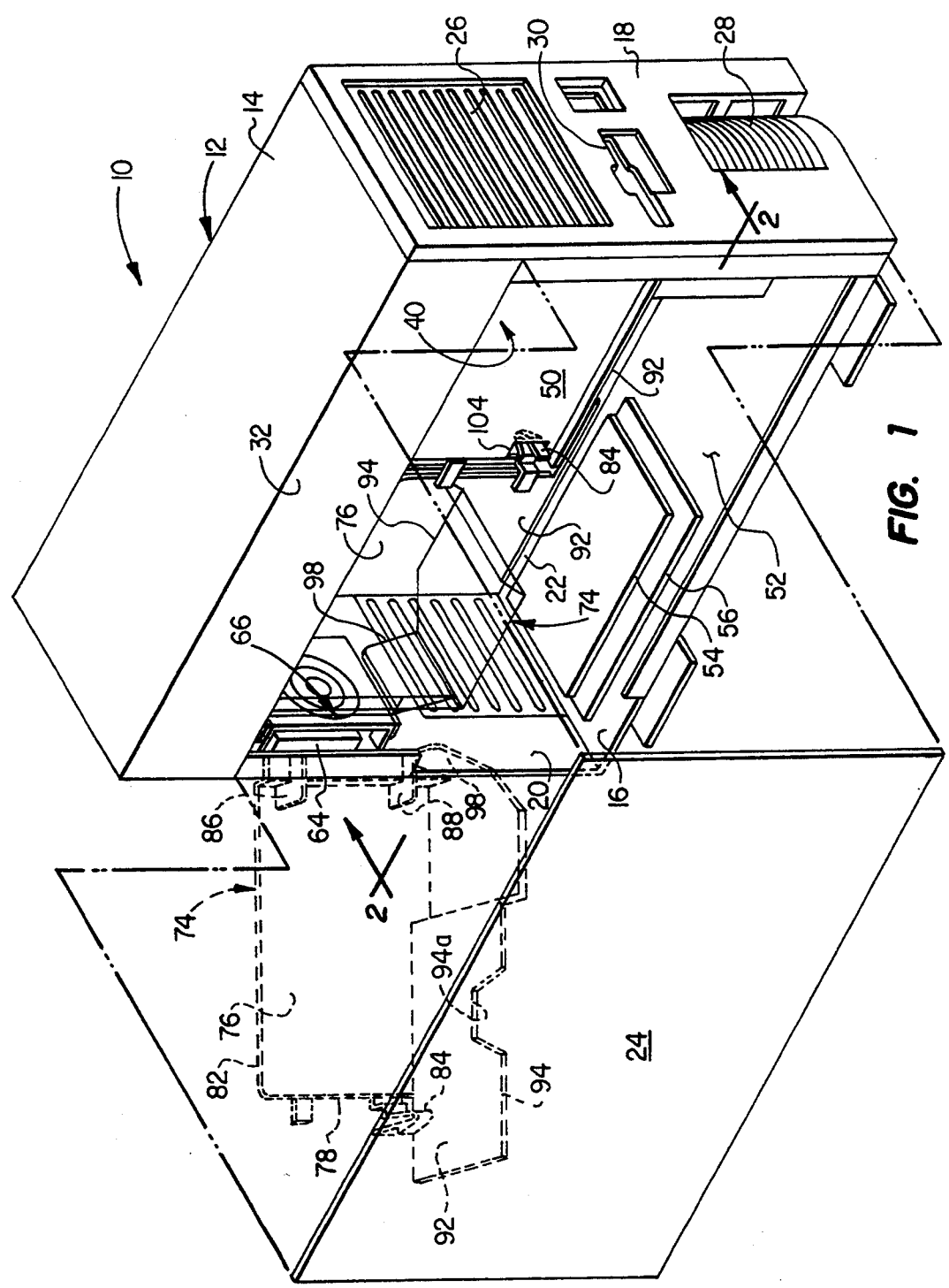
FIG. 1 is a simplified, partially exploded front and left side perspective view of an improved computer tower unit embodying principles of the present invention.
Figure 2:
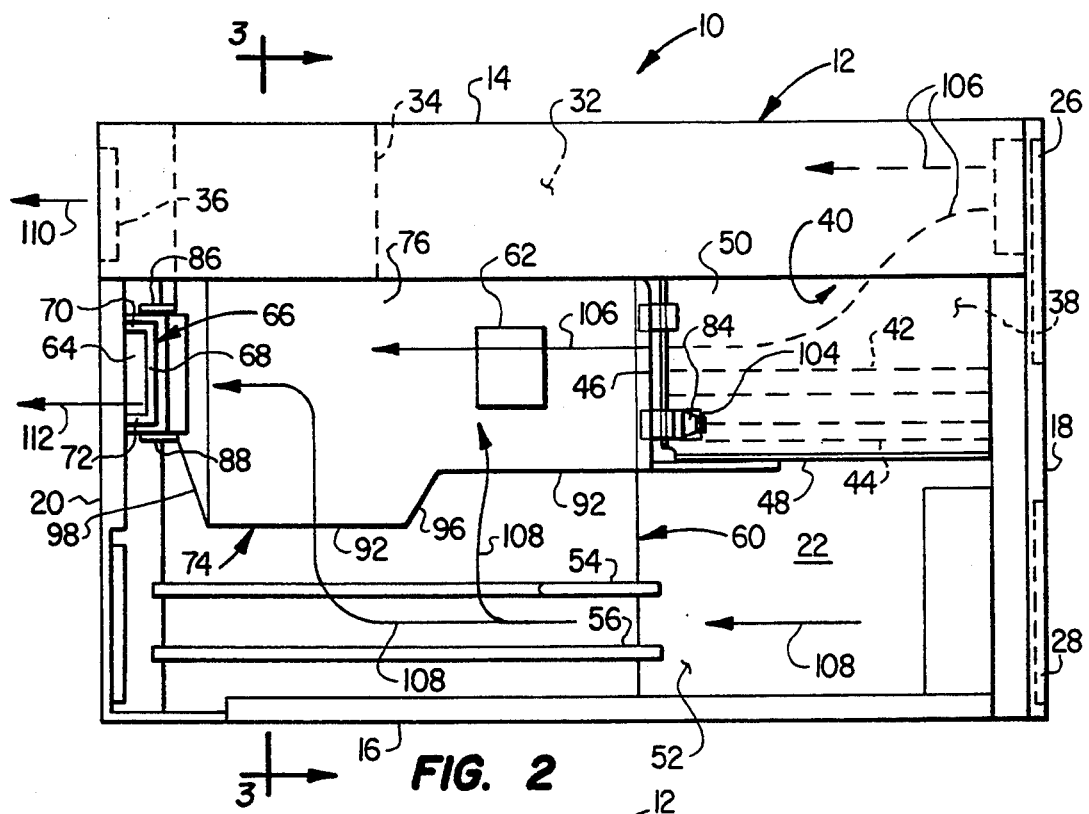
FIG. 2 is a simplified left side elevational view of the improved computer tower unit taken along line 2—2 of FIG. 1.
Figure 3:
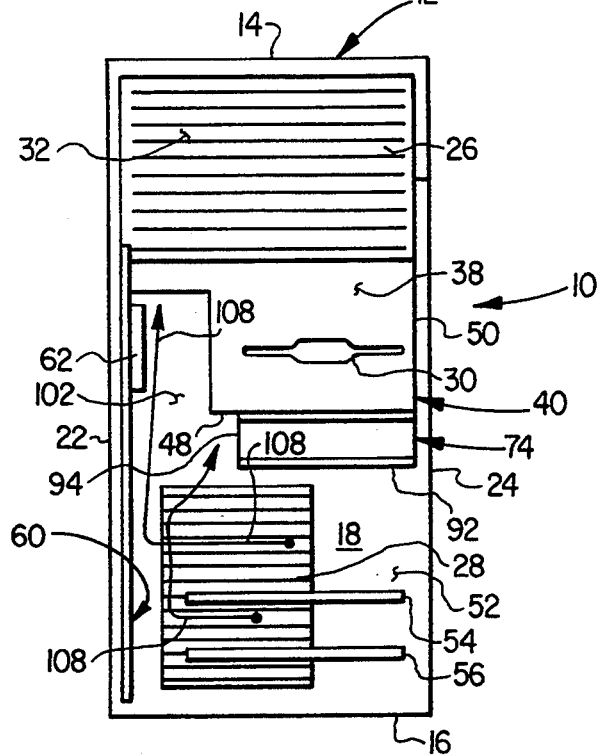
FIG. 3 is a simplified cross-sectional view through the improved computer tower unit taken along line 3—3 of FIG. 2.

As illustrated in FIGS. 1–3, the present invention provides a computer tower unit 10 having incorporated therein an improved internal cooling system designed to efficiently dissipate operating heat generated by the various electronic operating components disposed within the tower unit. The computer tower unit 10 includes a vertically elongated, generally rectangular housing 12 having top and bottom walls 14 and 16, vertically elongated front and rear end walls 18 and 20, a right side wall 22, and a left side wall 24 which, as illustrated in FIG. 1, may be removed to provide access to the interior of the housing 12.

Upper and lower cooling air intake structures 26,28 are respectively disposed on the front housing end wall 18 above and below a disk insertion slot 30 formed therein. Directly behind an upper portion of the air intake structure 26 is a power supply area 32 that extends internally through a top section of the housing 12 from the air intake structure 26 to the rear housing end wall 20. A power supply unit 34 (see FIG. 2) is mounted in the interior housing area 32, in a rear portion thereof, and is spaced forwardly apart from a power supply cooling fan 36 mounted on an upper section of the rear housing end wall 20.

The entire bottom side of the power supply area 32 is open and communicates at a front end portion thereof with the open top side of a drive and multimedia disk mounting area 38 disposed within a generally U-shaped sheet metal mounting chassis 40 positioned beneath a front end portion of the power supply area 32. As schematically illustrated in phantom in FIG. 2 (and omitted from FIG. 3 for illustrative clarity), a vertically spaced plurality of disk drives 42,44 may be operatively mounted in a conventional manner in the area 38.

The rear end 46 of the chassis structure 40 open and spaced forwardly apart from the rear housing end wall 20, the bottom wall 48 of the chassis structure is positioned somewhat above the bottom air intake structure 28, the chassis structure has an outer side wall 50 which is inwardly adjacent the housing side wall 24 when it is attached to the balance of the housing 12, and an upper portion of the disk mounting area 38 upwardly overlaps a bottom portion of the upper air intake structure 26.

Positioned below the internal chassis structure 40, and extending rearwardly from the air intake structure 28 to the rear housing end wall 20, is an expansion card area 52. A vertically spaced pair of representative expansion cards 54 and 56 are shown operatively mounted in a rear portion of the expansion card area 52. The expansion card area 52 communicates with the open bottom side of the power supply area 32 through the space between the rear housing end wall 20 and the rear end 46 of the chassis structure 40, and communicates with the interior of the chassis structure 40 via its open rear end.

The main system motherboard 60 (see FIGS. 2 and 3) is vertically mounted on the interior side of the right housing side wall 22. Motherboard 60 horizontally extends generally between the rear housing end wall 20 and the rear end 46 of the chassis structure 40, and vertically extends generally between the bottom housing wall 16 and the open bottom side of the power supply area 32. Among other electrical components mounted on the motherboard 60 (and not illustrated herein) is a main microprocessor 62 which is disposed along an upper edge portion of the motherboard 60.

As best illustrated in FIGS. 1 and 2, a main system cooling fan 64 is mounted on the rear housing end wall 20, immediately below the power supply area 32, in a generally U-shaped bracket structure 66 having a vertical base wall 68 and transverse top and bottom end walls 70 and 72.

During operation of the computer tower unit 10 the two fans 36 and 64 function to flow air through the interior of the housing 12 in a manner dissipating heat generated by the various electronic components therein and preventing such components from overheating. According to a key aspect of the present invention, this internal housing cooling is achieved without the necessity of providing a separate side-mounted third fan located at the disk mounting area 38 to cool the various disk drives 42,44 therein.

Figure 4:
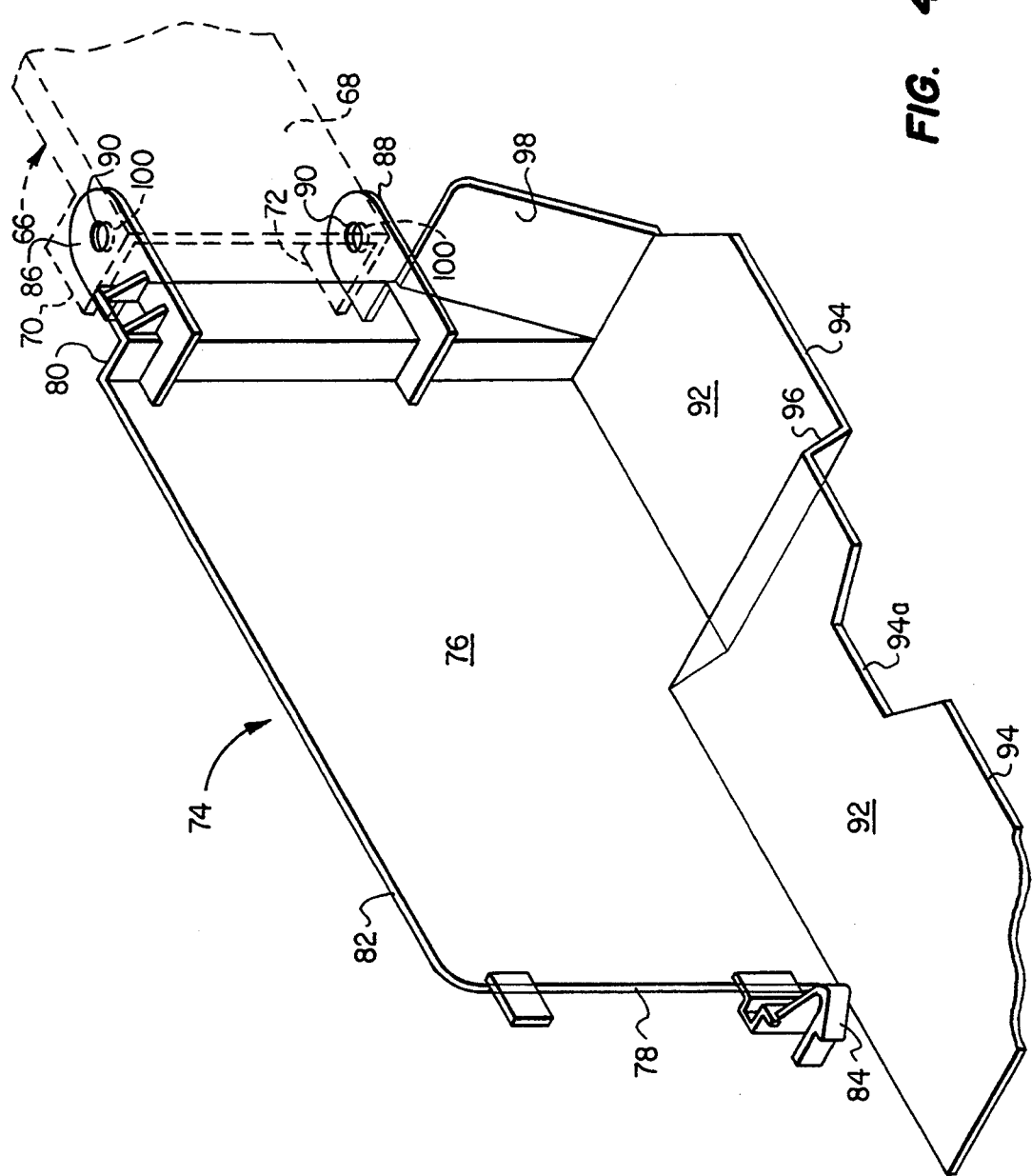
FIG. 4 is an enlarged scale perspective view of a specially designed interior cooling air baffle structure incorporated in the improved computer tower unit.

This advantageous elimination of the necessity for a third cooling fan is achieved in the present invention by the incorporation within the housing 12 of a specially designed cooling air flow control baffle member 74 that is preferably formed of a transparent molded plastic material. As best illustrated in FIG. 4, the baffle member 74 has a generally rectangular vertical outer side wall 76 with a front side edge portion 78, a rear side edge portion 80, and a top side edge portion 82. A resilient latch structure 84 is molded onto the front side edge portion, and a vertically spaced pair of mounting tab structures 86 and 88, having opposed cylindrical boss projections 90 on their facing sides, are molded onto the rear side edge portion 80.

An elongated horizontal base wall 92 laterally projects inwardly from a lower edge portion of the wall 76 and has an inner side edge 94 with an inset portion 94a. As illustrated, the wall 92 has a front end portion that projects forwardly beyond the front end 78 of the wall 76, a downwardly offset longitudinally intermediate portion 96, and an upturned rear end portion 98.

The baffle member 74 is connected to the housing 12 by snapping the tab bosses 90 into circular holes 100 formed in the bracket end walls 70,72 as best illustrated in FIG. 4. When connected in this manner, the baffle member 74 is pivotable relative to the housing 12 from a solid line operating position (see FIG. 1) and a dotted line housing access position. When the baffle member 74 is in its operating position, the vertical baffle wall 76 extends between the rear end of the chassis structure 40 and the fan bracket 66 and is generally aligned with the outer chassis side wall 50.

The baffle member base wall 92 is spaced upwardly apart from the bottom housing wall 16, and a front end portion of the base wall 92 underlies the chassis structure 40. As best illustrated in FIG. 3, the inner side edge 94 of the horizontal baffle wall 92 is spaced outwardly apart from the motherboard 60 in a manner forming between the motherboard and the inner side edge 94 a vertical air flow space 102 disposed beneath The processor 62. The baffle member 74 may be releasably locked in its operating position by simply snapping the latch 84 into a suitable opening 104 in the chassis side wall 50 (see FIGS. 1 and 2).

During operation of the computer tower unit 10, with the housing side wall 24 attached to the balance of the housing and the latch member 74 in its operating position, the two cooling fans 36,64 draw ambient air flows 106,108 into the interior of the housing 12 respectively through the upper and lower air intake structures 26,28 as indicated in FIG. 2. A first portion of the air flow 106 is drawn by the fan 36 through the power supply area 32, and through the power supply unit 34, before being discharged by the fan 36 as indicated by the arrow 110 in FIG. 2. A second portion of the air flow 106 is drawn by the fan 64 through the disk mounting area 38, and rearwardly across an upper portion of the motherboard 60, before being discharged by the fan 64 as indicated by the arrow 112.

The second incoming air flow 108, as schematically shown in FIGS. 2 and 3, is initially drawn rearwardly through the expansion card area 52 and flowed over and through the space(s) between the expansion cards 54,56. The air flow 108 exiting the area 52, as best shown in FIG. 3, is then caused by the baffle member 74 to be deflected horizontally toward the motherboard 60 and then turn upwardly through the air flow space 102 between the baffle member side edge 94 and the motherboard 60, thereby causing the upwardly moving air flow 108 to sweep across the motherboard 60, and its processor 62. The air flow 108, together with the indicated portion of the air flow 106, is then drawn rearwardly into the fan 64 and discharged therefrom as indicated by the arrow 112 in FIG. 2. In this manner, the baffle member 74 efficiently directs the overall interior housing air flow through all of its heat prone component areas in a manner providing adequate housing interior cooling with the use of only two cooling fans.

Many tower users prefer to operate the indicated tower unit 10 (in its previously proposed configuration without the baffle member 74) with the housing side wall 24 removed, feeling that the removal of the housing wall 24 will enhance the cooling of the tower's internal operating components. However, the removal of the wall 24 tends to have just the opposite effect, tending to undesirably "short circuit" the cooling air around the internal computer equipment to be cooled by the unit's cooling fans.

The use of the baffle member 74, in addition to permitting the elimination of a cooling fan, also substantially alleviates this air flow short circuiting problem when the tower unit 10 is operated with the housing wall 24 removed. In this operating mode, air entering the now open left side of the housing is still forced to be drawn toward the motherboard 60 and then turned upwardly along its upper portion before being drawn rearwardly along the motherboard, and its processor 60, and then rearwardly discharged through the main system cooling fan 64.

The air baffle member 74 provides its air flow pattern control function without adversely affecting inspection and service access to the interior of the tower housing 12. As indicated in FIG. 1, with the housing side wall 24 removed, the baffle member 74 may be unlatched and pivoted outwardly to its dotted line access position to provide substantially unimpeded access to the motherboard 60. Additionally, because the baffle member 74 is transparent, a visual inspection of the motherboard is permitted even without unlatching and outwardly pivoting the baffle member.

It can also be seen in FIG. 1 that the baffle member 74 may be pivoted outwardly beyond the plane of the rear housing end wall 20 at which point the rear end of the baffle member 74 engages the rear housing end wall 20. This "over center" pivoting capability of the baffle member 74 permits the housing 12 to be rested on its right side wall 22 for service purposes with the outwardly pivoted baffle member conveniently supporting itself in its fully opened access position.

What is claimed is:

1. A computer tower unit comprising:
   a housing having top and bottom exterior walls, opposed front and rear exterior end walls extending vertically between said top and bottom exterior walls, and opposed first and second side walls extending horizontally between said front and rear exterior end walls and extending vertically between said top and bottom exterior walls;
   an air intake structure operatively disposed on a bottom portion of said front exterior end wall;
   a system cooling fan mounted on said rear exterior end wall, at a level higher than that of said air intake structure, and operative to draw ambient cooling air inwardly through said air intake structure rearwardly through the interior of said housing, and then discharge the cooling air from said housing;
   a vertically oriented printed circuit board interiorly mounted on said first housing side wall; and
   baffle means mounted in said housing and operative to cause cooling air being drawn rearwardly through the housing by said system cooling fan to be sequentially flowed toward, upwardly along, and then rearwardly along said printed circuit board before being discharged by said system cooling fan, said baffle means having a horizontal wall portion extending transversely to said printed circuit board and positioned above said bottom exterior wall of said housing, said horizontal wall portion of said baffle means having an inner, horizontally extending side edge spaced apart from said printed circuit board in an opposing relationship with a side surface thereof to form a vertical air flow gap between said horizontal wall portion of said baffle means and said printed circuit board.

2. The computer tower unit of claim 1 wherein:
   said second housing side wall is removable to create a side access opening on said housing through which ambient air may be drawn into said housing during operation of said system cooling fan, and
   said baffle means are further operative, during operation of said system cooling fan with said second side wall removed, to sequentially cause air entering the interior of said housing through said side access opening to sequentially flow toward, upwardly along, and then rearwardly along said printed circuit board before being discharged by said system cooling fan.

3. A computer tower unit comprising:
   a housing having top and bottom exterior walls, opposed front and rear exterior end walls extending vertically between said top and bottom exterior walls, and opposed first and second side walls extending horizontally between said front and rear exterior end walls and extending vertically between said top and bottom exterior walls;

an air intake structure operatively disposed on a bottom portion of said front exterior end wall;

a system cooling fan mounted on said rear exterior end wall, at a level higher than that of said air intake structure, and operative to draw ambient cooling air inwardly through said air intake structure rearwardly through the interior of said housing, and then discharge the cooling air from said housing;

a vertically oriented printed circuit board interiorly mounted on said first housing side wall; and baffle means mounted in said housing and operative to cause cooling air being drawn rearwardly through the housing by said system cooling fan to be sequentially flowed toward, along and then rearwardly along said printed circuit board before being discharged by said system cooling fan, said second housing side wall being removable to create a side access opening on said housing through which ambient air may be drawn into said housing during operation of said system cooling fan, said baffle means being further operative, during operation of said system cooling fan with said second side wall removed, to sequentially cause air entering the interior of said housing through said side access opening to sequentially flow toward, upwardly along, and then rearwardly along said printed circuit board before being discharged by said system cooling fan, said baffle means including a baffle member mounted on said housing for pivotal movement relative thereto between an operating position in which said baffle member is disposed within said housing in a facing, spaced apart relationship with an upper portion of said printed circuit board, and an access position in which said baffle member is pivoted outwardly through said side access opening to expose said upper portion of said printed circuit board, said computer tower further comprising latch means for releasably holding said baffle member in said operating position thereof.

4. The computer tower unit of claim 3 wherein:

said baffle member includes a vertical wall portion which, with said baffle member in said operating position thereof, is in a parallel, spaced apart, facing relationship with said upper portion of said printed circuit board, and a horizontal wall portion projecting from a lower edge portion of said vertical wall portion, said horizontal wall portion, with said baffle member in said operating position thereof, projecting toward said circuit board and having an inner side edge portion spaced horizontally apart from said printed circuit board.

5. The computer tower unit of claim 4 wherein:

said baffle member is formed from a transparent plastic material.

6. A computer tower unit comprising:

a housing having top and bottom exterior walls, opposed front and rear exterior end walls extending vertically between said top and bottom exterior walls, and opposed first and second side walls extending horizontally between said front and rear exterior end walls and extending vertically between said top and bottom exterior walls;

a first interior housing area extending along an upper portion of said housing between said front and rear end walls;

a power supply unit operatively disposed in said first interior area;

a second interior housing area extending below and communicating with a front portion of said first interior area and being upwardly spaced apart from said bottom housing wall;

a drive unit operatively disposed in said second interior area;

a third interior housing area extending through a lower portion of said housing beneath said second interior housing area, said third interior housing area communicating with said first and second interior housing areas and extending rearwardly through said housing generally from said front housing end wall to said rear housing end wall, said third interior housing area being adapted to have at least one expansion card operatively mounted in a rear portion thereof;

a first air intake structure mounted on said front housing end wall over the front end of said first interior housing area and an upper front end portion of said second interior housing area;

a second air intake structure mounted on said front housing end wall over the front end of said third interior housing area;

a power supply cooling fan mounted on said rear housing end wall at the rear end of said first interior housing area;

a system cooling fan mounted on said rear housing end wall, beneath the rear end of said first interior housing area, in a rearwardly spaced, generally facing relationship with said second interior housing area;

a vertically oriented system motherboard mounted on the inner side of said first housing side wall, said motherboard horizontally extending generally between said system cooling fan and said second interior housing area, and vertically extending generally between said bottom housing wall and said first interior housing area; and cooling air flow control baffle means mounted in said housing, said cooling air flow control baffle means horizontally extending generally between said system cooling fan and said second interior housing area, and vertically extending downwardly from said first interior housing area to a location spaced upwardly apart from said bottom housing wall, said power supply and system cooling fans being operative to flow ambient cooling air sequentially through said first and second air intake structures, through said first, second and third interior housing areas, and then outwardly through said rear housing end wall, and said cooling air flow control baffle means being operative to cause cooling air entering said housing through said second air intake structure to sequentially flow toward, upwardly along, and rearwardly along said motherboard before being discharged through said rear housing end wall.

7. The computer tower unit of claim 6 wherein:

said second housing side wall is removable to create a side access opening on said housing through which ambient air may be drawn into said housing during operation of said power supply and system cooling fans, and said baffle means are further operative, during operation of said power supply and system cooling fans with said second side wall removed, to sequentially cause air entering the interior of said housing through said side access opening to sequentially flow toward, upwardly along, and then rearwardly along said motherboard before being discharged through said rear housing end wall.

8. The computer tower unit of claim 7 wherein:

said baffle means include a baffle member mounted on said housing for pivotal movement relative thereto between an operating position in which said baffle member is disposed within said housing in a facing, spaced apart relationship with an upper portion of said motherboard, and an access position in which said baffle member is pivoted outwardly through said side access opening to expose said upper portion of said motherboard, and said computer tower unit further comprises latch means for releasably holding said baffle member in said operating position thereof.

9. The computer tower unit of claim 8 wherein:

said baffle member includes a vertical wall portion which, with said baffle member in said operating position thereof, is in a parallel, spaced apart, facing relationship with said upper portion of said motherboard, and a horizontal wall portion projecting from a lower edge portion of said vertical wall portion, said horizontal wall portion, with said baffle member in said operating position thereof, projecting toward said motherboard and having an inner side edge portion space horizontally apart from said motherboard.

10. The computer tower unit of claim 9 wherein:

said baffle member is formed from a transparent plastic material.

* * * * *